(12) United States Patent
Zweighaft et al.

(10) Patent No.: US 6,775,092 B2
(45) Date of Patent: Aug. 10, 2004

(54) LATERAL TAPE MOTION SENSOR

(75) Inventors: James Zweighaft, Boulder, CO (US); Philip John Turner, Broomfield, CO (US)

(73) Assignee: Quantum Corporation, Milpitas, CA (US)

(*) Notice: Subject to any disclaimer, the term of this patent is extended or adjusted under 35 U.S.C. 154(b) by 367 days.

(21) Appl. No.: 10/011,928

(22) Filed: Dec. 7, 2001

(65) Prior Publication Data

US 2003/0107836 A1 Jun. 12, 2003

(51) Int. Cl.[7] .............................................. G11B 5/584
(52) U.S. Cl. ................................................... 360/77.12
(58) Field of Search ....................................... 360/77.12

(56) References Cited

U.S. PATENT DOCUMENTS

| | | |
|---|---|---|
| 4,414,593 A | 11/1983 | Miller et al. |
| 5,196,969 A | 3/1993 | Iwamatsu et al. |
| 5,371,638 A | 12/1994 | Saliba |
| 5,999,359 A | 12/1999 | Fasen |
| 2001/0002158 A1 | 5/2001 | Cope et al. |
| 2002/0080514 A1 * | 6/2002 | Richards et al. ........... 360/72.2 |

* cited by examiner

Primary Examiner—David Hudspeth
Assistant Examiner—Mitchell Slavitt
(74) Attorney, Agent, or Firm—Patton Boggs LLP (57) ABSTRACT

A lateral tape sensor for a tape drive having a tape head that is not capable of moving vertically as quickly as tape media, wherein the sensor senses lateral movement of tape media as it moves along a tape path between a storage reel and a take-up reel. The lateral tape motion sensor comprising a means for sensing the position of at least one edge of the tape media and a means for comparing the at least one edge position to predetermined thresholds to determine if the tape media moved laterally. When the lateral movement exceeds predetermined thresholds, the tape drive processor and control circuits respond to prevent accidentally overwriting data previously written on an adjacent track during a write operation, to adjust the tape head to locate data being read following lateral tape motion that occurs during a read operation or to warn the user of poor tape media quality.

16 Claims, 4 Drawing Sheets

FIG. 7

LATERAL TAPE MOTION SENSOR

FIELD OF THE INVENTION

The invention relates to digital tape drive storage devices, and in particular, to a lateral tape motion sensor that detects and responds to lateral movement of multitrack tape media.

PROBLEM

It is a problem in the field of tape drives to maintain alignment of the tape drive head assembly and the track as data is being transferred to or from the magnetic tape media as the magnetic tape media is wound between the supply reel located with the tape cartridge and the take-up reel located within the tape drive while providing a plurality of narrow tracks on one length of tape media. Providing a plurality of narrow tracks on one length of tape media for recording data increases tape storage densities. To maximize capacity, tracks are recorded as closely as possible to adjacent tracks. It is a problem in the field of tape drives to prevent overwriting data previously written on an adjacent track when the magnetic tape media moves laterally.

Lateral tape motion (commonly referred to as LTM) is movement of the tape media in a direction perpendicular to the tracks. Lateral tape motion is the tendency of tape media to move laterally due to poor quality tape media, excessive usage of a tape cartridge, excessive vibration or movement of the tape drive during operation, wobbling of the supply or take-up reel, or by imperfect tape guides. It is common practice in the industry to discard tapes after a plurality of uses to prevent inadvertent erasure of data on adjacent tracks due to LTM.

Apparatus are known for adjusting the position of the tape head in response to lateral movement of the tape media and for maintaining the alignment of the tape media as data is transferred to and from the tape media. These devices include apparatus to prevent overwriting data on an adjacent track by detecting lateral tape motion and quickly moving the tape head in the same direction to compensate for the movement. However, precise measurement of the tape motion and a fast mechanical response is required, making such systems complex and therefore costly solutions to a common problem.

Read After Write System:

Miller, (U.S. Pat. No. 4,414,593) discloses a serpentine tape drive apparatus for writing and reading data on a magnetic tape. Using a write-read magnetic head, information is written onto the tape and subsequently read and checked in a continuous manner to assure the correctness of the data written onto the tape. In a serpentine tape drive, the tape moves past the head in a first direction, and when the end of the tape is reached, the head is adjusted to a new track and the tape travels past the head in an opposite direction as the write-read operation continues. Writing and reading as the tape moves in opposite directions provides adjacent serpentine tracks. Reading the data immediately after a write verifies that the data written is correct. The read after write system described in the Miller patent does not check adjacent tracks as data is being written to prevent the tape head from writing over data on an adjacent track.

Track Following Systems:

Apparatus are known for adjusting the magnetic head while reading and writing to maintain alignment between the head and the edge of the tape. The track following servo apparatus disclosed by Saliba, (U.S. Pat. No. 5,371,638) reduces cross talk and the effects of lateral tape motion by adjusting the position of the magnetic head during read and write operations. The apparatus includes a magnetic head with longitudinally placed read and write head gaps and a servomotor for adjusting the head. The read gaps are laterally offset from the write gaps and data is read immediately after a write to check for errors. If the read does not correspond to the write, the data is rewritten. The recorded data includes both low frequency servo blocks and higher frequency data. As a track is written, the adjacent tracks are monitored for low frequency servo data. When servo data is encountered, the write is temporarily suspended. The servo data is compared with predetermined reference data to determine a corresponding head adjustment. The reference data may be last recorded head positional information. The tape head is adjusted corresponding to the servo data in relation to the predetermined reference data. If the tape head is adjusted, a new positional reference is created and stored. The embedded blocks of servo data are also used during reading.

While this system, referred to in the industry as a track following servo system, reduces the risk of overwriting data on adjacent tracks, it requires a costly, precise mechanism capable of moving the tape head as quickly as the tape media moves. Providing a complex apparatus with an additional read/write head that quickly responds to lateral tape motion is expensive and not suitable for use with slower responding tape head designs. The positioning apparatus for adjusting the magnetic head during reading and writing disclosed by Fasen, (U.S. Pat. No. 5,999,359) uses a light source that moves with the head to monitor the distance between the head and the edges of the tape media. The light source illuminates the light detector that generates a motor drive signal for adjusting the position of the tape head as necessary.

This system measures the distance between the head and the edge of the tape to obtain and maintain alignment. When the distance between the head and the edge of the tape varies, the tape head is adjusted. The head adjustment is in reference to the lateral edge of the tape without taking into consideration the adjacent tracks. The apparatus disclosed by Fasen employs an expensive tape head design that can move fast enough to follow the signal from the light source. While the apparatus adjusts the tape head to compensate for lateral tape motion, like the track following servo apparatus previously described, the apparatus is complex and therefore expensive.

Another track following apparatus utilizing a light source for positioning the tape head is disclosed by Iwamatsu, (U.S. Pat. No. 5,196,969) and includes a feedback control apparatus for precisely positioning the head. The feedback control comprises a light emitting source located on one side of the magnetic tape and a plurality of light receiving devices located on the opposite side of the tape and directly across from the light emitting device. The light receiving devices are positioned relative to tracks and with respect to each other to provide tape position feedback. The plurality of light receiving devices has a predetermined relation that governs the feedback control when the magnetic head is moved to a predetermined track position. When the feedback from the plurality of light receiving devices varies from the predetermined track position, the head is adjusted correspondingly.

As the tape head moves widthwise to an adjacent track, the light receiving device corresponding to that track should be illuminated by the light emitting device. Similarly, as the head is reading or writing data, the system monitors the light received by the plurality of light receiving devices to determine the alignment of the head with respect to the tape. Data received from the light receiving devices is compared to the predetermined data, and if a misalignment is encountered, the tape head is adjusted accordingly.

The track following apparatus described above provide an apparatus and method for responding to lateral tape motion, however, the apparatus must have the capability of moving fast enough to follow the vertical tape motion because the tape is so light that it can move very quickly. Apparatus that monitor the lateral position of the tape media and quickly adjust the tape head to compensate for the movement are therefore complex, expensive and are known to be prone to error. The described track following apparatus are not suitable for less expensive, slower responding tape heads.

Tape Aligning:

Another method for aligning tape media with the tape head disclosed in Cope, (Pat. App. No. 20010002158) comprises a series of guide rollers to maintain the alignment of the tape media as it travels past the tape head. One set of guide rollers have a tapered contact surface that applies an upward force on the tape media causing it to maintain constant alignment with the top edge of the guide rollers. As the tape media varies during winding the upward force holds the tape media against the top edge of the guide rollers, which in turn realigns the tape track with the tape head. When the tape media drifts laterally, the rollers realign the tape media keeping the tape media aligned with the tape head. Sudden lateral tape movement realigns over a short period, however, the system does not provide a means to prevent writing data on an adjacent track in the while the tape is realigning.

The read after write system continuously verifies the correctness of the data written, however, the read after write systems offers no protection whatsoever against vertical movement of the tape media The previously described track following apparatus provide a means for preventing writing on a adjacent track when the tape media experiences lateral movement. However, known apparatus that measures the lateral tape motion with a sensor and use fast head mechanisms to follow the motion are complex, costly and are known to be prone to error.

For these reasons, a need exists for a lateral tape motion detector for use with less expensive, slow responding tape head to prevent the accidental erasure of data when lateral movement exceeds a predetermined threshold.

SOLUTION

The present lateral tape motion sensor overcomes the problems outlined above and advances the art by providing a sensor that continuously monitors the tape media position and responds when the change in position exceeds predetermined thresholds for a tape drive having a tape head that is not capable of moving vertically as fast as the tape media. A first advantage of the present lateral tape motion sensor is to prevent overwriting data previously recorded on an adjacent track during a write operation. A second advantage of the lateral tape motion sensor is to reduce the time required to search for data during a read operation following a lateral movement of the tape media. A third advantage of the lateral tape motion sensor is to warn users of poor tape quality.

An embodiment of the present lateral tape motion sensor (hereinafter referred to as LTM sensor) comprises a single edge sensing apparatus for continuously monitoring an edge of the tape media as the tape media is wound between the supply reel in the tape cartridge and the take-up reel in the tape drive. The single edge sensing device comprises a light emitting source and a light detecting device for monitoring the top edge or the bottom edge of the tape media.

In another embodiment, the lateral tape motion sensor comprises a dual edge sensing apparatus for continuously sensing the position of the tape media top edge and bottom edge and a method for comparing the movement of the top edge with the movement of the bottom edge to determine a corrective action when the difference exceeds a predetermined threshold.

In the dual edge embodiment, the sensing apparatus includes a top edge sensor and a bottom edge sensor each having a light emitting source and a light detecting device. The light emitting sources and the light detecting devices are horizontally parallel and located on opposite sides of the tape media. In another configuration, the sensing apparatus comprises a light emitting source and a corresponding apparatus located on the opposite side of the light emitting source for detecting light falling above and below the top and bottom edge of tape media. In the various configurations, the sensing apparatus is positioned such that a portion of the light emitted from the light emitting source falls on the light detecting device during normal operation. When the tape media moves laterally, the amount of light falling on the light detecting device varies correspondingly and the light detecting device generates a signal proportional to the amount of light falling on the light detecting device.

The dual edge LTM sensor also includes a method for responding to the variation in movement between tape media top and bottom edges. The dual edge LTM sensor senses the direction and the magnitude of the vertical movement. When the difference between the movement of the top edge and the bottom edge exceed a predetermined threshold, the dual edge LTM sensor responds accordingly. A variation in the top or bottom edge position without a corresponding variation in the opposite edge position, may be the result of a tear or other abnormality in the tape media, and the dual edge LTM sensor assembly may disregard the variation. When approximately equal and opposite variations occur in the top and the bottom tape edge positions, the variation is compared with predetermined thresholds. Variations exceeding the threshold require a system response depending on whether the tape drive is performing a read or a write operation.

Read Operation

When the single edge and dual edge LTM sensors responds to a variation in the lateral position of the tape media during a read operation, the system determines whether the read could be read. If the tape drive was able to read the data, no action is necessary. Conventional tape drives stop, rewind a short distance and attempt to re-read the data following an unsuccessful read. An unsuccessful read simultaneous with sensed vertical movement of the tape media first results in a re-read. If the re-read is unsuccessful, the single edge or dual edge LTM sensor utilizes the direction and magnitude of the movement to determine the approximate location of the data to be read and the magnetic head position is adjusted accordingly. The present single edge and dual edge LTM sensors eliminate the need to randomly search for the data by changing the head position slightly, re-reading the data, and making another head adjustment if the re-read is still unsuccessful. Reducing the time consumed randomly searching for data following lateral movement of the tape improves the overall data throughput.

Write Operation

During a write operation, the present single edge and dual edge LTM sensors protect against the accidental overwrite of data on an adjacent track. When the lateral tape motion exceeds a predetermined threshold during a write operation, the present single edge and dual edge LTM sensors suspend the write operation. The tape drive incorporating the present LTM sensor includes a tape head that does not move vertically as fast as the tape media. Therefore, when lateral tape motion is detected, the LTM sensor signals the tape head control mechanism to suspend a write operation to prevent overwriting data on an adjacent track. The write operation is resumed when the lateral tape movement is no longer detected or the tape head control mechanism has had sufficient time to adjust the tape head. The time between sensing the lateral movement and suspending the write operation is minimal.

In an embodiment of the single edge and dual edge LTM sensors, the drive stops, rewinds and attempts to write the data again. If lateral tape motion is sensed during the subsequent re-write, the write operation is again suspended. In another embodiment of the single edge and dual edge LTM sensors, the write operation is suspended until lateral tape motion is no longer detected, then the write operation is resumed.

Various responses to LTM occurring during a write operation affect the tape drive operational characteristics. Suspending the write operation until lateral movement is not longer sensed increases the throughput while decreasing the storage capacity of the length of tape media. Similarly, while re-writing increases the storage capacity of the length of tape media, the re-write takes time, decreasing the throughput. The responses reside in software which can be configured operate in accord with the various embodiments of the single and dual edge LTM sensors.

Tape Media Quality

In another embodiment of the single edge and dual edge LTM sensors, a plurality of lateral tape motions sensed during one longitudinal pass might be used to indicate poor tape quality or as advance warning of tape degradation due to excessive usage. An indicator located on the tape drive may be illuminated to warn users of the sensed tape media quality.

The present single edge and dual edge LTM sensors operate with less expensive, slow responding tape head mechanisms to reduce or eliminate the undesirable effects of lateral tape motion. The single and dual edge LTM sensors sense vertical movement of the tape media and respond to the movement when it exceeds predetermined thresholds to protect against accidental overwrite on adjacent tracks during a write operation. The single edge and dual edge LTM sensors also provides a method for locating data following excessive lateral movement that occurs during a read operation and can warn the user of poor tape quality. Thus, the single edge and dual edge LTM sensors improve the quality of the data recorded on the tape media and increases the data throughput during read operations without the increased cost associated with a faster responding tape head.

DETAILED DESCRIPTION

The invention summarized above and defined by the enumerated claims may be better understood by referring to the following detailed description, which should be read in conjunction with the accompanying drawings. This detailed description of the preferred embodiment is not intended to limit the enumerated claims, but to serve as a particular example thereof. In addition, the phraseology and terminology employed herein is for the purpose of description, and not of limitation.

When lateral tape movement occurs during tape drive operation, the present LTM sensor reduces the time required to recover from an unsuccessful read operation and prevent unintentionally overwriting data recorded on an adjacent track during a write operation. Once data is overwritten on an adjacent track, the previously recorded data is not recoverable.

Figure 1:
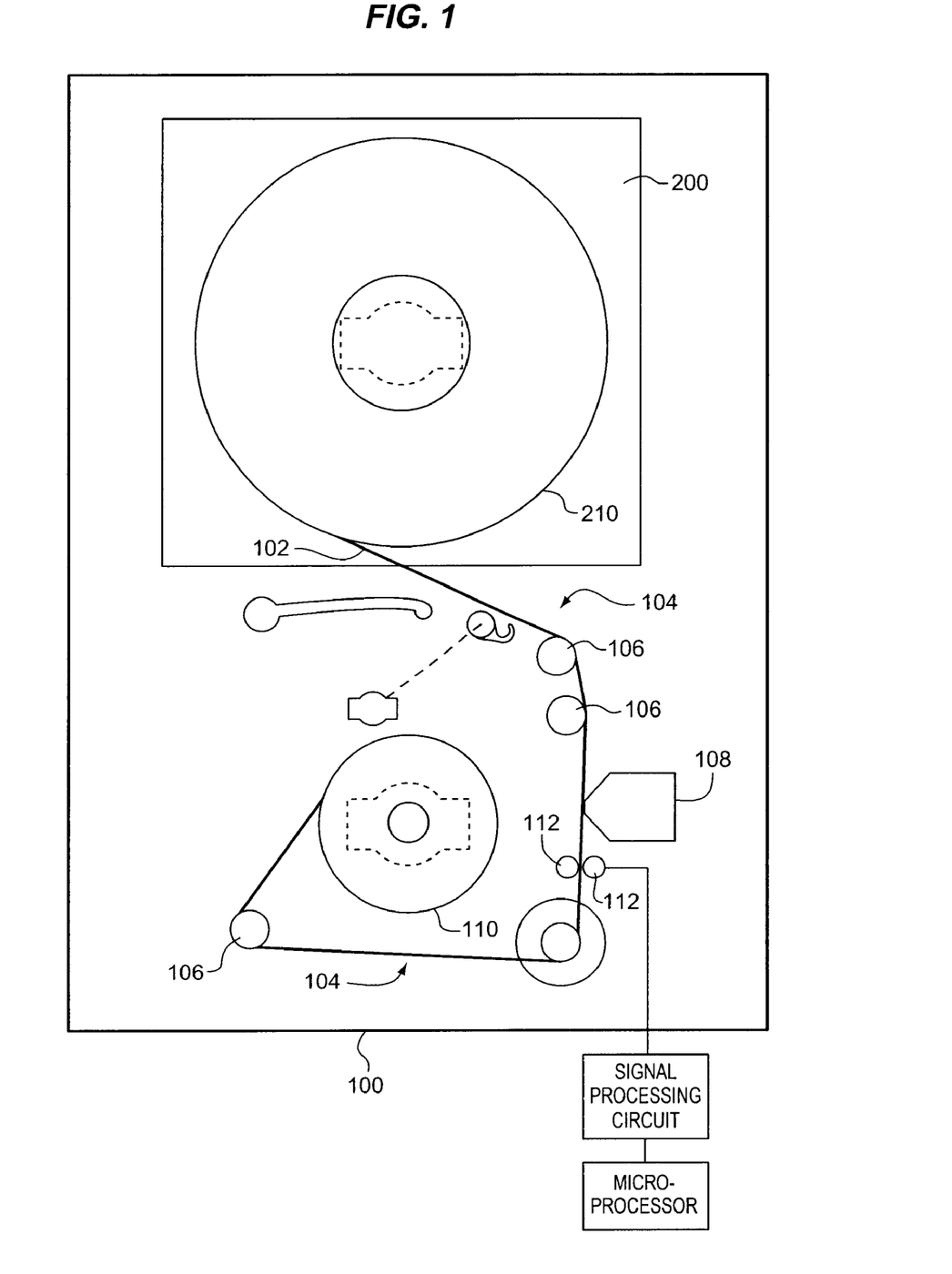
FIG. 1 illustrates a prospective view of a tape drive embodying the present lateral tape motion sensor.

FIG. 1 illustrates tape drive 100 embodying the LTM sensor 112. The magnetic tape media 102 is wound between storage reel 210 and take-up reel 110 through tape path 104. Tape path 104 comprises guide rollers 106, LTM sensor 112 and tape head 108. Tape head 108 is not capable of moving vertically as fast as tape media 102 as tape media 102 is wound between storage reel 210 and takeup reel 110. Tape drive 100 also includes other components commonly known in the tape drive art such as microprocessor and signal processing circuits that control tape drive operation. Microprocessor and signal processing circuits are conventional circuits and the processor is configured with software to operate in accord with the various embodiment of the LTM sensor. The software will be apparent to those skilled in the art in the context of the following discussion.

An embodiment of the present LTM sensor comprises a single edge sensing apparatus for continuously monitoring an edge of the tape media as the tape media is wound between the supply reel in the tape cartridge and the take-up reel in the tape drive. The single edge sensing device comprises a light emitting source and a light detecting device for monitoring the top edge or the bottom edge of the tape media. While the LTM sensor can be configured to monitor a top edge or a bottom edge of the tape media, both the top edge and the bottom edge can be monitored simultaneously. For purpose of illustration and not limitation, the present LTM sensor will be discussed in detail using the dual edge configuration.

Figure 2:
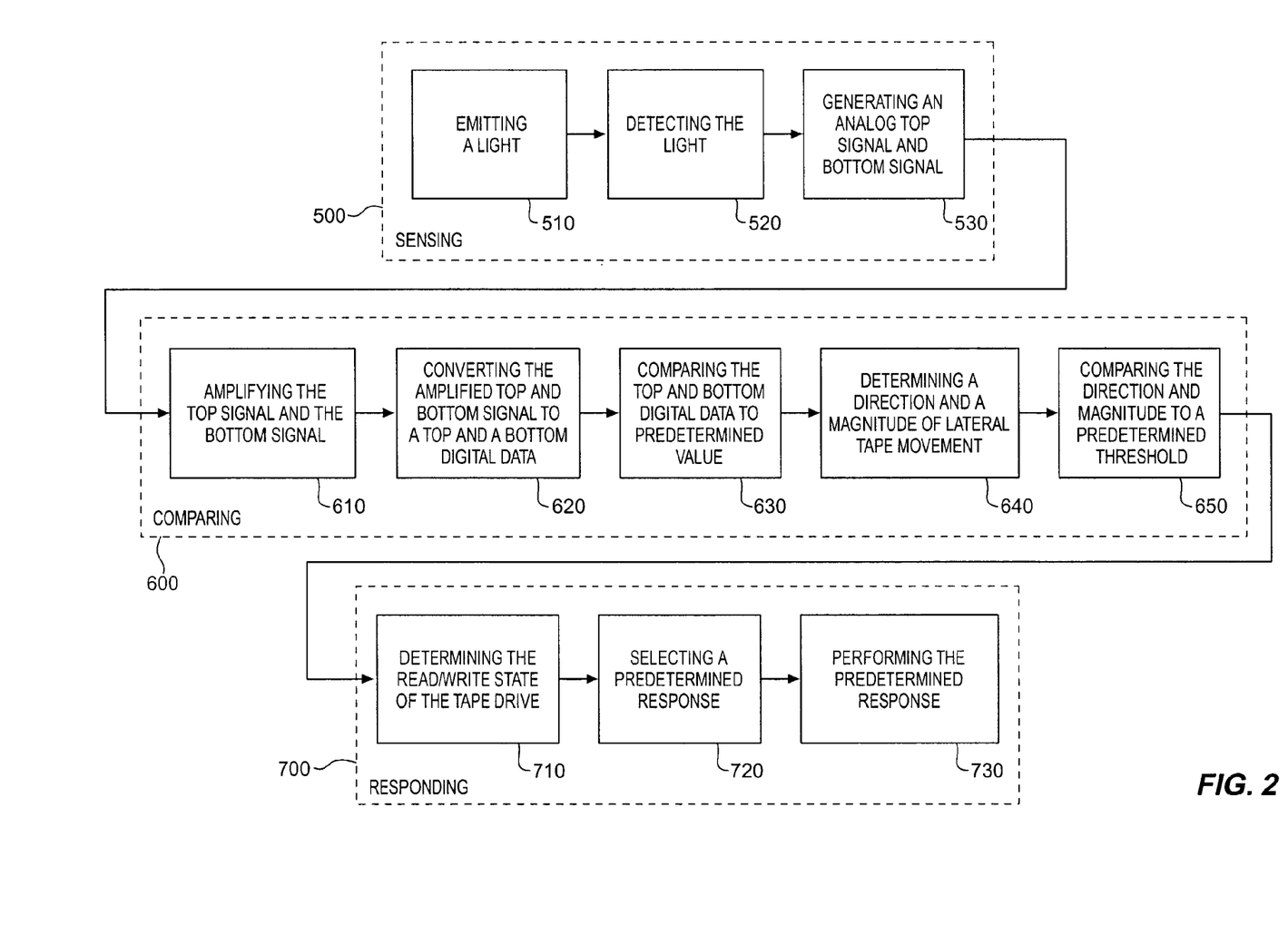
FIG. 2 illustrates a flowchart of a method for using the present lateral tape motion sensor.

Referring to FIG. 2, the present dual edge lateral tape motion sensor continuously senses the position of the top and the bottom edge of the tape media in block 500 as the tape media moves across the tape head assembly during a read or a write operation. The light emitting source emits light in block 510 that is received by the light detecting device in block 520 to sense the position of the top and bottom edge of the tape media in block 500 and generate a corresponding analog top and bottom signal in block 530. Major components of the present LTM sensor are top edge sensor, bottom edge sensor and a circuit for monitoring the position of the tape media top and bottom edge as it moves across the tape head and comparing the position to predetermined position data.

Returning to FIG. 1, tape drive 100 moves tape media 102 between the supply reel 210 located in the tape cartridge 200 and the take-up reel 110 located in the tape drive 100. As tape media 102 moves it is guided by guide rollers 106 and passes between LTM sensor 112 and past tape head 108. Placement of the LTM sensor close to the head assembly allows the LTM sensor to quickly respond to lateral movement of the tape media. For illustration purposes, the LTM sensor is discussed and illustrated on one side of tape head 108 although the LTM sensor could be located on the opposite side of tape head 108 or on both sides.

Sensing Lateral Tape Motion

Figure 3:
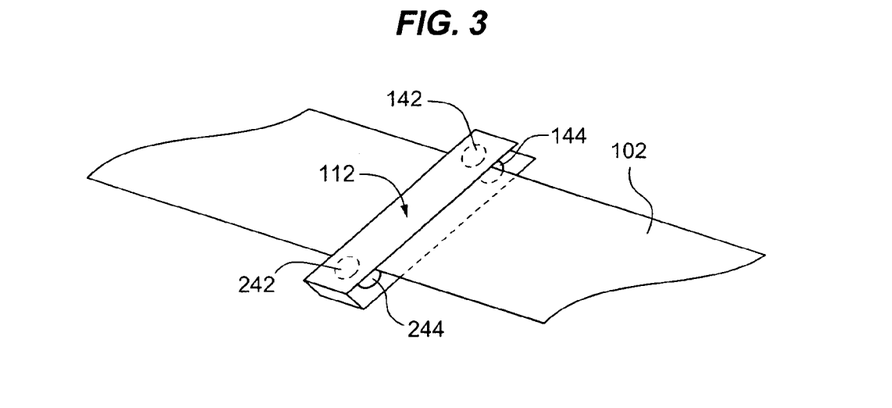
FIG. 3 illustrates a prospective view of the present dual edge lateral tape motion sensor.
Figure 7:
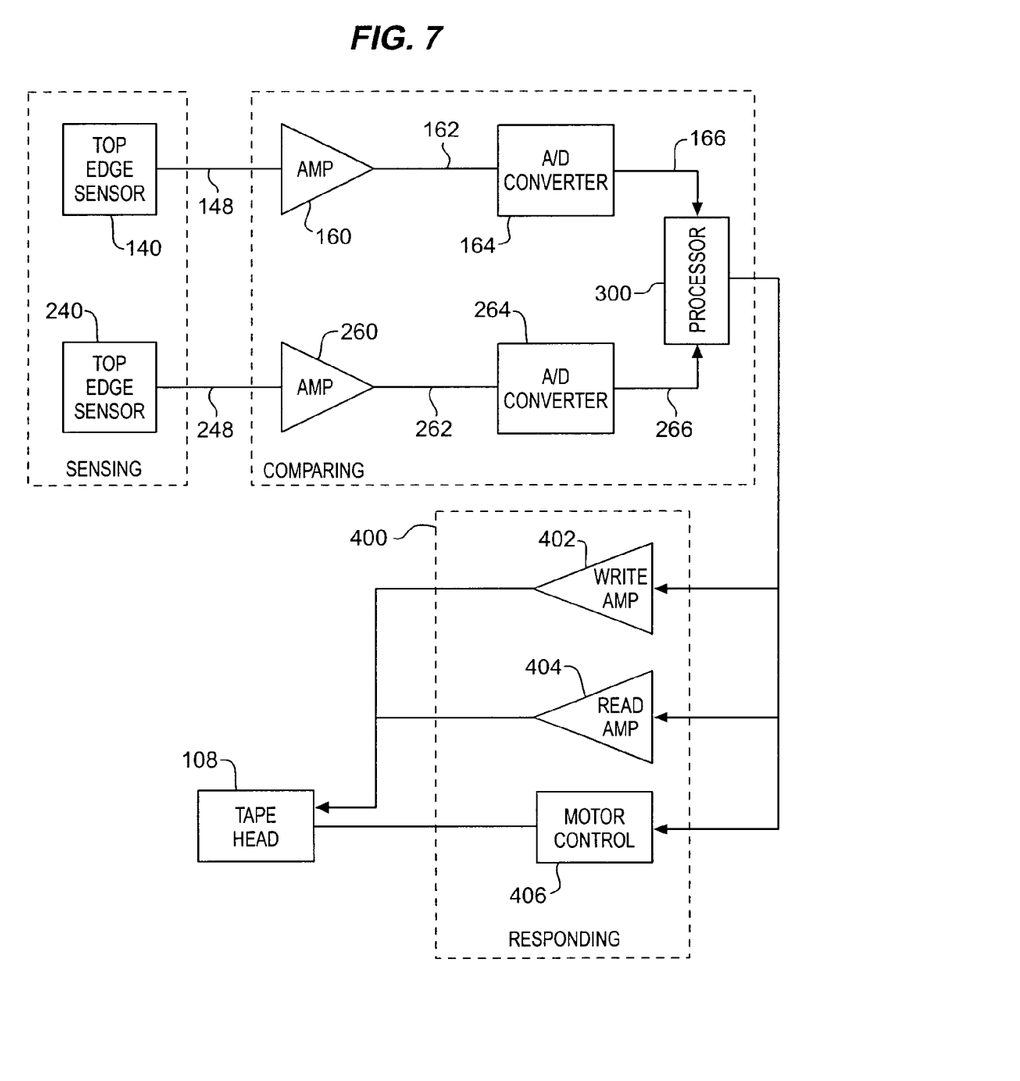
FIG. 7 illustrates a schematic block diagram of the present dual edge lateral tape motion sensor.

The major components of the present dual edge LTM sensor are a top tape edge sensor, a bottom tape edge sensor, and circuitry to continuously monitor the position of the top and bottom edge of the tape media. Referring to FIGS. 3 and 7, the top edge sensor comprises light emitting source 142 and light detecting device 144 and the bottom edge sensor comprises light emitting source 242 and light detecting device 244. Light emitting sources 142 and 242 and light detecting devices 144 and 244 are positioned across from one another and on opposite sides of tape media 102. Light emitting source 142 and light detecting device 144 sense the position of top edge 104 of tape media 102 and light emitting source 242 and light detecting device 244 sense the position of the bottom edge 204 of tape media 102.

Light emitting sources and light detecting devices are usually paired, one light emitting source and one light-detecting device. In both the single edge and dual edge configuration, the pairs can be comprised of a light emitting diode and a corresponding phototransistor or photo intrinsic diode for receiving light from the light emitting diode. For higher speed signaling, the light detecting device may be a laser diode or an avalanche photo diode. These light emitting and light detecting pairs are for illustration, alternative light sources and detectors will be apparent to those skilled in the art.

Figure 4:
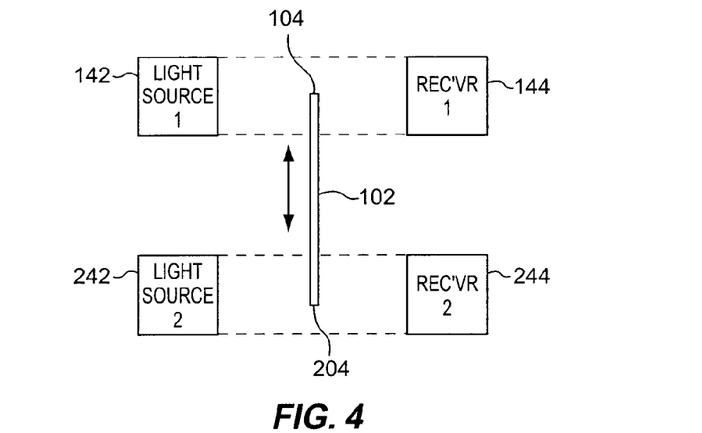
FIG. 4 illustrates a side view of the dual edge lateral tape motion sensor with the tape media in a center position.

Referring to FIG. 4, light emitting sources 142 and 242 are vertically aligned such that top edge 104 and bottom edge 204 of tape media 102 travel between approximately the center of the top edge sensor and the bottom edge sensor. In normal operation, as tape media 102 moves between the LTM sensor, light from light emitting sources 142 and 242 fall on a portion of light detecting devices 144 and 244. When lateral tape motion occurs, tape media 102 moves up or down and the light falling on light detecting devices 144 and 244 increases or decreases corresponding to the direction of the lateral movement of tape media 102. Light emitting sources 142 and 242 are illustrated fixedly attached to one side of a bracket and light detecting devices 144 and 244 fixedly attached on the adjacent side of the bracket. The bracket can be attached to the top or the bottom of the tape drive. The bracket is for illustration purposes and is not intended to limit the scope of the present LTM sensor, alternative mounting configurations will be apparent to those skilled in the art.

Figure 5:
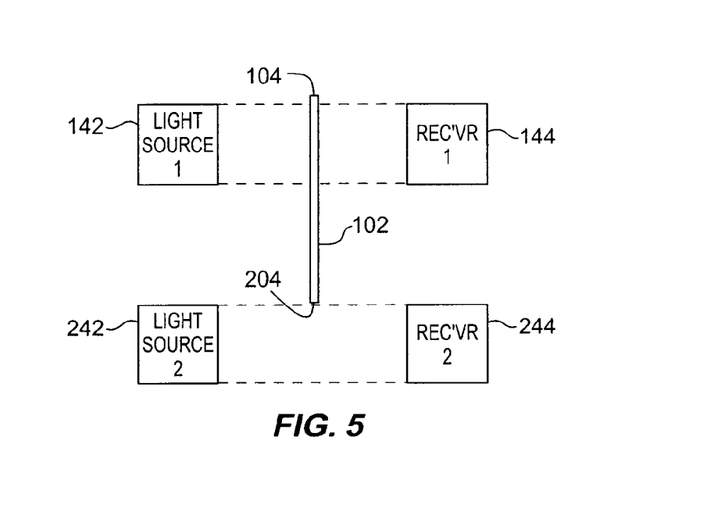
FIG. 5 illustrates a side view of the dual edge lateral tape motion sensor with the tape media position laterally offset in the upward direction.

Referring to FIG. 5, when tape media 102 moves laterally upward, tape media 102 blocks more light from top edge light emitting source 142, thus decreasing the amount of light that falls on top edge light detecting device 144. The signal generated by top edge light detecting device 144 relates to the amount of light detected, a decrease in light falling on top edge light detecting device 144 generates a corresponding analog signal. Likewise, as the light falling on bottom edge light detector 244 increases, the signal generated by bottom edge light detecting device 144 corresponds to the increase in detected light.

Figure 6:
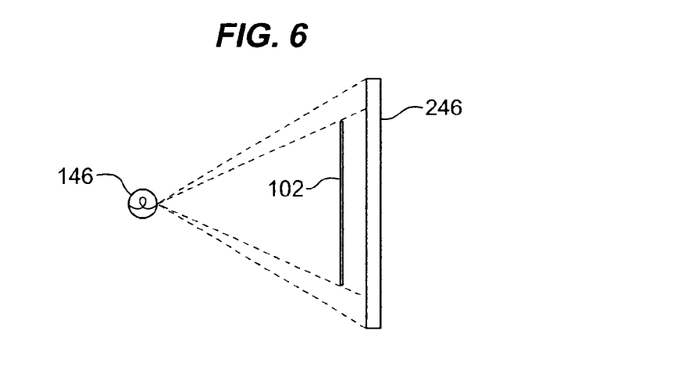
FIG. 6 illustrates a side view of an alternative lateral tape motion sensor.

Referring to FIG. 6, in an alternative embodiment of the LTM sensor, the sensing apparatus comprises a light emitting source 146 and a corresponding light detecting apparatus 246 located on the opposite side of the tape media for detecting light falling above and below tape media 102 top edge 112 and bottom edge 114. In this embodiment, light detecting apparatus 246 generates at least two signals corresponding to the amount of light that falls above and below the tape media top and bottom edge.

Responding to Lateral Tape Motion

Referring back to FIG. 2, the LTM sensor is continuously sensing the position of the top and bottom edge of the tape media and generating an analog top and bottom signal in block 530 relating to the top and bottom position of the tape media. After amplifying and converting the analog top and bottom signals to corresponding top and a bottom digital data in blocks 610 and 620, the digital data are compared to a predetermined value in block 630. The LTM sensor uses the top and bottom digital data for determining a direction and a magnitude of lateral tape movement in block 640 and comparing the direction and magnitude to a predetermined threshold in block 650.

Referring to FIG. 7, the apparatus for comparing the position of the top and bottom edge of the tape media consists of top and bottom amplifiers 160 and 260, analog-to-digital converters 164 and 264, and a processor 300. Top and bottom analog signals 148 and 248 generated by top and bottom edge sensors 140 and 240 respectively, are amplified by amplifiers 160 and 260. Amplified top and bottom analog signals 162 and 262 are then converted by analog-to-digital converters 164 and 264 to corresponding top and bottom digital data 166 and 266. The value of top and bottom digital data 166 and 266 correspond to the amplitude of top and bottom analog signals 162 and 262.

Processor 300 compares the value of top and bottom digital data 166 and 266 to predetermined stored values to determine the position of the top and bottom edge of the tape media. When the tape media moves laterally, processor 300 calculates the direction and magnitude of the lateral movement. Processor 300 compares the direction and magnitude of the movement to predetermined thresholds stored in memory to determine a corrective response.

An advantage of the dual edge LTM sensor is the ability to differentiate between lateral movement of the tape media and a damaged edge of the tape media. A change in position of the top edge or the bottom edge without a corresponding change in position of the opposite edge may indicate damage to one edge of the tape media or a fold on one edge. An area of tape media that is poorly coated may cause a change in digital data for one or both edges, however, the changed signals would indicate an inward movement, or narrowing of the tape media. The processor reaction to this type of change can be to suspend the write cycle until the monitored edges return to their normal position. The predetermined response to lateral tape movements varies depending whether the tape drive is performing a read or a write operation.

Referring again to FIG. 2, the method of responding in block 700 to sensed lateral tape motion is dependent in block 710 on determining whether the tape drive is reading data from or writing data to the tape media when the lateral movement occurred. Once the read/write operation has been determined, the processor selects a predetermined response in block 720 and the control circuit performs the predetermined response in block 730.

Read Operation

Referring back to FIG. 7, processor 300 sends a signal to signal processing circuit 400 comprised of write amplifier 402, read amplifier 404, and motor controller 406. Processor

300 and signal processing circuit 400 controls tape drive operation. The response to sensed lateral tape motion that exceeds a predetermined threshold may include a conventional re-read if the read operation was unsuccessful.

Processor 300 sends signals to read amplifier 404 to temporarily suspend reading and to motor controller 406 to stop, rewind a distance and re-read the data. If the re-read fails, the position of tape head 108 may require aligning. Processor 300 uses stored data including the track being read before lateral movement, and the direction and magnitude of the movement to calculate a head position most likely for successfully reading the data. Processor 300 sends alignment signals to signal processing circuit 400 to adjust the tape head alignment accordingly. The LTM sensor eliminates the need to randomly search for the data to be read, thus, improving the throughput of the tape drive.

Write Operation

Lateral tape motion exceeding predetermined thresholds during a write operation can result in writing data on an adjacent track that has been previously written to. Once data is written over existing data, the previously written data is not recoverable. To eliminate or reduce overwriting on adjacent tracks when the tape media moves laterally, the LTM sensor senses the lateral movement and responds accordingly.

The tape drive incorporating the present LTM sensor includes a tape head that does not move vertically as quickly as the tape media. Therefore, when lateral tape motion is detected, the LTM sensor signals the tape head control mechanism to suspend a write operation to prevent overwriting data on an adjacent track. The write operation is resumed when the lateral tape movement is no longer detected or the tape head control mechanism has had sufficient time to adjust the tape head.

Referring again to FIG. 7, the response to sensed lateral tape motion that does not exceed a predetermined threshold may include a rewrite. Processor 300 sends a signal to signal processing circuit 400 to temporarily suspend writing, stop and rewind the tape and attempt to write the data again. If the lateral tape motion reoccurs, the quality of the section of tape being written may be degraded and the response may be to suspend writing until the lateral movement is no longer sensed, then proceed writing.

The predetermined responses are programmable and have a different effect on the overall operational characteristics of the tape drive. To increase write operation throughput, processor 300 may temporarily suspend the write operation and resume writing when the movement is no longer sensed. On the other hand, suspending the write operation decreases the tape capacity and the response may be to stop, rewind and attempt to rewrite data on the section of tape. Then, if the rewrite is suspend a second time due to a subsequent lateral tape motion, the predetermined response may be to suspend the write operation until lateral tape motion is no longer sensed.

Tape Media Quality

In another embodiment of the single edge and dual edge LTM sensors, when a plurality of successive lateral tape motions are sensed during a read or a write operation, it can be used to indicate poor tape quality or as advance warning of tape degradation due to excessive usage. In the dual edge LTM sensor configuration, a change in the top and bottom position of the tape media that occur simultaneously but are not opposite, may indicate that the tape is narrowing, or stretching due to a blockage in the tape path or the section of tape media may be stretched due to excessive usage. The predetermined response can be programmed to illuminate an indicator light to inform the user of the degraded quality of the tape media.

The processor's response to changes in top and/or bottom edge locations resides in software that is configured to operate in accord with the various embodiments of the LTM sensor and will be apparent to those skilled in the art in the context of the foregoing discussion.

The present single edge and dual edge lateral tape motion sensor configurations provide a means for sensing vertical movement and responding to the movement when it exceeds predetermined thresholds. The predetermined responses protect against accidental overwrite on adjacent tracks during a write operation, provides a means for locating data following excessive lateral movement that occurs during a read operation and can warn the user of poor tape quality. Thus, the LTM sensor improves the quality of the data recorded on the tape cartridge and increases the data throughput during read operations without the increased cost associated with more expensive, faster responding tape heads.

While the present LTM sensor has been illustrated and discussed using the dual edge configuration, the single edge configuration will also provide enhanced response to lateral movement of tape media in less expensive tape drives having slow responding head adjust mechanisms. Likewise, although the present LTM sensor has been illustrated and discussed utilizing a set or sets of light emitting and light detecting devices, alternative tracking methods could be substituted.

For example, the LTM sensor could be configured to operate in conjunction with a servo track. Using the servo track, the lateral position of the tape media may be determined by an increase or decrease in magnetic flux detected by the servo head mechanism. Similarly, an alternative type of track could be incorporated onto the tape media such as a track on one side of the tape media and then the track could be monitored to detect lateral movement of the tape media. While a few alternative configurations have been presented, those skilled in the art will appreciate that other configurations can be substituted.

It is apparent that there has been described a lateral tape motion sensor for tape drive, that fully satisfies the objects, aims, and advantages set forth above. While the lateral tape motion sensor has been described in conjunction with specific embodiments thereof, it is evident that many alternatives, modifications, and/or variations can be devised by those skilled in the art in light of the foregoing description. Accordingly, this description is intended to embrace all such alternatives, modifications and variations as fall within the spirit and scope of the appended claims.

What is claimed is:

1. A lateral tape motion sensor for use with a tape drive having a tape head that moves vertically at a slower rate than the tape media, wherein the tape head transfers a plurality of data to and from a tape media having a plurality of tracks between a top edge and a bottom edge, comprising:

a means for sensing a position of the tape media and generating a signal in relation to the position of the tape media;

a means for comparing the generated signal with a predetermined signal to determine a change in the position of the tape media; and a means for suspending the tape head operation until the comparison of the generated signal and the predetermined signal does not exceed the predetermined threshold.

2. The lateral tape motion sensor of claim 1, wherein the means for sensing comprises:

a means for sensing a position of an edge of the tape media and generating the signal in relation to the position of the edge of the tape media.

3. The lateral tape motion sensor of claim 2, wherein the means for sensing a position of an edge of the tape media further comprises:
 a light emitting means located on one side of the tape media and emitting a light in the direction of the tape media, wherein a portion of the emitted light passes over the top edge of the tape media or under the bottom edge of the tape media;
 a light detecting means located on the opposite side of the tape media from the light emitting means for detecting the light that passes over the top edge of the tape media or under the bottom edge of the tape media; and
 a means for generating a signal in relation to the amount of light that is detected by the light detecting means.

4. The lateral tape motion sensor of claim 1, wherein the means for sensing comprises:
 at least one track on the tape media;
 a means for sensing a position of the at least one track on the tape media relative to the tape head, wherein when the sensed position of the at least one track on the tape media exceeds a predetermined threshold, the responding means responds accordingly.

5. The lateral tape motion sensor of claim 4, wherein the means for sensing a position of the at least one track on the tape media further comprises:
 a read head for reading the at least one track on the tape media; wherein a position of the at least one track relative to the tape head is determined by the amount of magnetic flux that is sensed by the read head and when the sensed amount of flux exceeds at least one predetermined threshold, the responding means responds accordingly.

6. The lateral tape motion sensor of claim 1, wherein the sensing means comprises:
 a means for sensing a position of the top edge and the bottom edge of the tape media and generating a top signal and a bottom signal relating to the position of the top edge and the bottom edge of the tape media and generating a top signal and a bottom signal in relation to the position of the top edge and the bottom edge.

7. The lateral tape motion sensor of claim 6, wherein the sensing means comprises:
 a means for emitting a light located on one side of the tape media and emitting the light in the direction of the tape media, wherein a portion of the emitted light passes over the top edge and under the bottom edge of the tape media;
 a means for detecting the emitted light that passes over the top edge and under the bottom edge of the tape media, the detecting means located on the opposite side of the tape media diagonal from the light emitting means; and
 a means for generating a top signal and a bottom signal in relation to the amount of the light detected by the detecting means.

8. The lateral tape motion sensor of claim 6, wherein the comparing means comprises:
 a means for amplifying the top signal and the bottom signal;
 a means for converting the amplified top signal and the amplified bottom signal to a top digital data and a bottom digital data;
 a means for comparing the top digital data and the bottom digital data to at least one predetermined value to determine a direction and a magnitude of the lateral movement of the tape media; and
 a means for comparing the direction and the magnitude of lateral movement of the tape media to at least one predetermined threshold.

9. The lateral tape motion sensor of claim 6, wherein the responding means comprises:
 a means for determining a read/write operation of the tape drive when the direction and the magnitude of the lateral movement of the tape media exceed the at least one predetermined threshold;
 a means for selecting a predetermined response based on the determined read/write operation; and
 a means for performing the selected predetermined response.

10. The lateral tape motion sensor of claim 9, wherein the performing means temporarily suspends the write operation when the direction and the magnitude of the lateral movement of the tape media exceed the at least one predetermined threshold during the write operation.

11. The lateral tape motion sensor of claim 9, wherein the performing means aligns the position of the tape head when the direction and the magnitude of the lateral movement of the tape media exceed the at least one predetermined threshold during the read operation.

12. A lateral tape motion sensor for use with a disk drive having a tape head with a slow responding tape head adjustment mechanism, wherein the tape head transfers a plurality of data to and from a tape media, the tape media having a plurality of tracks between a top edge and a bottom edge, comprising:
 an edge sensor for sensing a position of an edge of the tape media, wherein the edge sensor generates a signal in response to the position of the edge of the tape media;
 a processing means having a memory for storing at least one predetermined threshold and at least one predetermined response, wherein the processing means compares the generated signal with the at least one predetermined threshold to select a corresponding at least one predetermined response; and
 a controller to perform the at least one predetermined response by adjusting the position of the tape head using the slow responding tape head adjustment mechanism.

13. A lateral tape motion sensor for use with disk drives having a tape head with a slow responding tape head adjustment mechanism, wherein the tape head transfers a plurality of data to and from a tape media, the tape media having a plurality of tracks between a top edge and a bottom edge, comprising:
 a top edge sensor for sensing a position of the top edge of the tape media, wherein the top edge sensor generates a top signal in response to the position of the top edge of the tape media;
 a bottom edge sensor for sensing a position of the bottom edge of the tape media, wherein the bottom edge sensor generates a bottom signal in response to the position of the bottom edge of the tape media;
 a processor having a memory to store at least one predetermined threshold and at least one corresponding predetermined response, wherein the processor compares the top signal and the bottom signal to determine a direction and a magnitude of lateral movement of the tape media and compares the direction and the magnitude to the at least one predetermined threshold to select a corresponding at least one predetermined response;

a controller to perform the corresponding at least one predetermined response;

at least two amplifiers to amplifying the top signal and the bottom signal, wherein one of the at least two amplifiers amplifies the top signal and generates a corresponding amplified top signal and the other one of the at least two amplifiers amplifies the bottom signal and generates a corresponding amplified bottom signal; and at least two analog-to-digital converters, wherein each of the at least two analog-to-digital converters is connected to one of the at least two amplifiers and one of the at least two analog-to-digital converters converts the amplified top signal to generates a top digital data and the other one the at least two analog-to-digital converters converts the amplified bottom signal to generate a bottom digital data.

14. A method for responding to lateral tape motion for use with a tape drive that consists of a processing means including a means for storing a predetermined threshold, a reel on which is wound a length of tape media the tape media having a plurality of tracks between a to edge and a bottomed edge, the method comprising:

continuously sensing a position of at least one edge of the tape media, said continuously sensing comprising:
emitting a light from at least one light emitting source, the at least one light emitting source located perpendicular to an edge of the tape media;
detecting the emitted light from the at least one light emitting source by at least one light detecting device, the at least one light detecting device located diagonal from the at least one light emitting source; and
generating at least one signal, wherein the at least one signal is generated by the corresponding at least one light detecting device;

continuously comparing the sensed edge position with at least one predetermined edge position to detect a lateral movement of the tape media and to determine a direction and a magnitude of a lateral movement of the tape media;

comparing the direction and the magnitude of the lateral movement of the tape media to a predetermined threshold; and responding when the compared direction and the compared magnitude exceed the predetermined threshold.

15. The method of claim 14, wherein responding further comprises:

determining the read/write operation of the tape drive;

selecting a predetermined response corresponding to the direction and the magnitude of the lateral movement of the tape media and the read/write operation of the tape drive; and performing the selected predetermined response.

16. The method of claim 14, further comprises:

amplifying the at least one signal to produce an amplified at least one signal;

converting the amplified at least one signal to an at least one digital data, wherein the at least one digital data corresponds to the position of an edge of the tape media; and determining the direction and the magnitude of lateral movement of the tape media from the at least one digital data.

* * * * *